(12) United States Patent
Klein

(10) Patent No.: US 8,739,158 B2
(45) Date of Patent: May 27, 2014

(54) COMMUNICATION REDIRECTION WHERE PRIMARY MACHINE IMAGES ARE CLONED TO SECONDARY MACHINE IMAGES

(75) Inventor: Paul F. Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/968,186

(22) Filed: Dec. 14, 2010

(65) Prior Publication Data

US 2012/0151478 A1    Jun. 14, 2012

(51) Int. Cl.
*G06F 9/455* (2006.01)

(52) U.S. Cl.
USPC .................................................. 718/1

(58) Field of Classification Search
USPC .................................................. 718/1
See application file for complete search history.

(56) References Cited

U.S. PATENT DOCUMENTS

| | | | |
|---|---|---|---|
| 7,469,279 B1 | 12/2008 | Stamler et al. | |
| 8,151,263 B1 * | 4/2012 | Venkitachalam et al. | 718/1 |
| 2004/0184401 A1 | 9/2004 | Nguyen et al. | |
| 2006/0037016 A1 | 2/2006 | Saha et al. | |
| 2009/0113034 A1 | 4/2009 | Krishnappa et al. | |
| 2009/0222812 A1 | 9/2009 | Nissen et al. | |
| 2010/0100879 A1 * | 4/2010 | Katiyar | 718/1 |
| 2011/0010515 A1 * | 1/2011 | Ranade | 711/162 |

FOREIGN PATENT DOCUMENTS

| | | |
|---|---|---|
| CN | 101170423 A | 4/2008 |
| EP | 1271847 A2 | 1/2003 |

* cited by examiner

*Primary Examiner* — Emerson Puente
*Assistant Examiner* — Steven Do
(74) *Attorney, Agent, or Firm* — Feb Cabrasawan

(57) ABSTRACT

Prior to a first primary machine image being cloned to a first secondary machine image and a second primary machine image being cloned to a second secondary machine image, a controller determines that the first primary machine image communicates with the second primary machine image. Cloning of the first primary machine image to the first secondary machine image and of the second primary machine image to the second secondary machine image is such that communication from the first secondary machine image to the second primary machine image is not directed to the second secondary machine image. Afterwards, a software agent running on the first secondary machine image changes a global machine image-wide hostname file at the first secondary machine image, so that the communication from the first secondary machine image to the second primary machine image is now directed to the second secondary machine image.

20 Claims, 3 Drawing Sheets

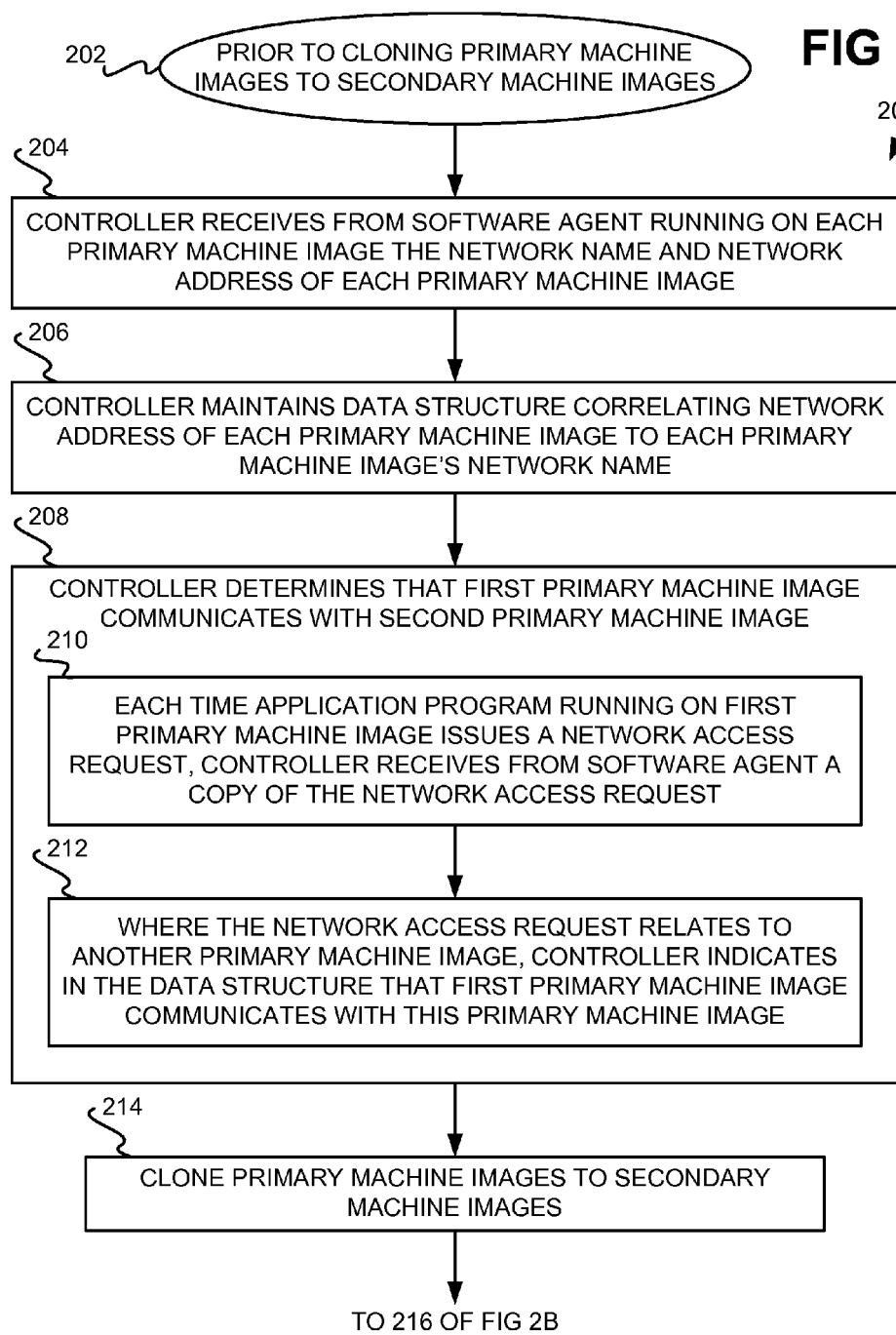

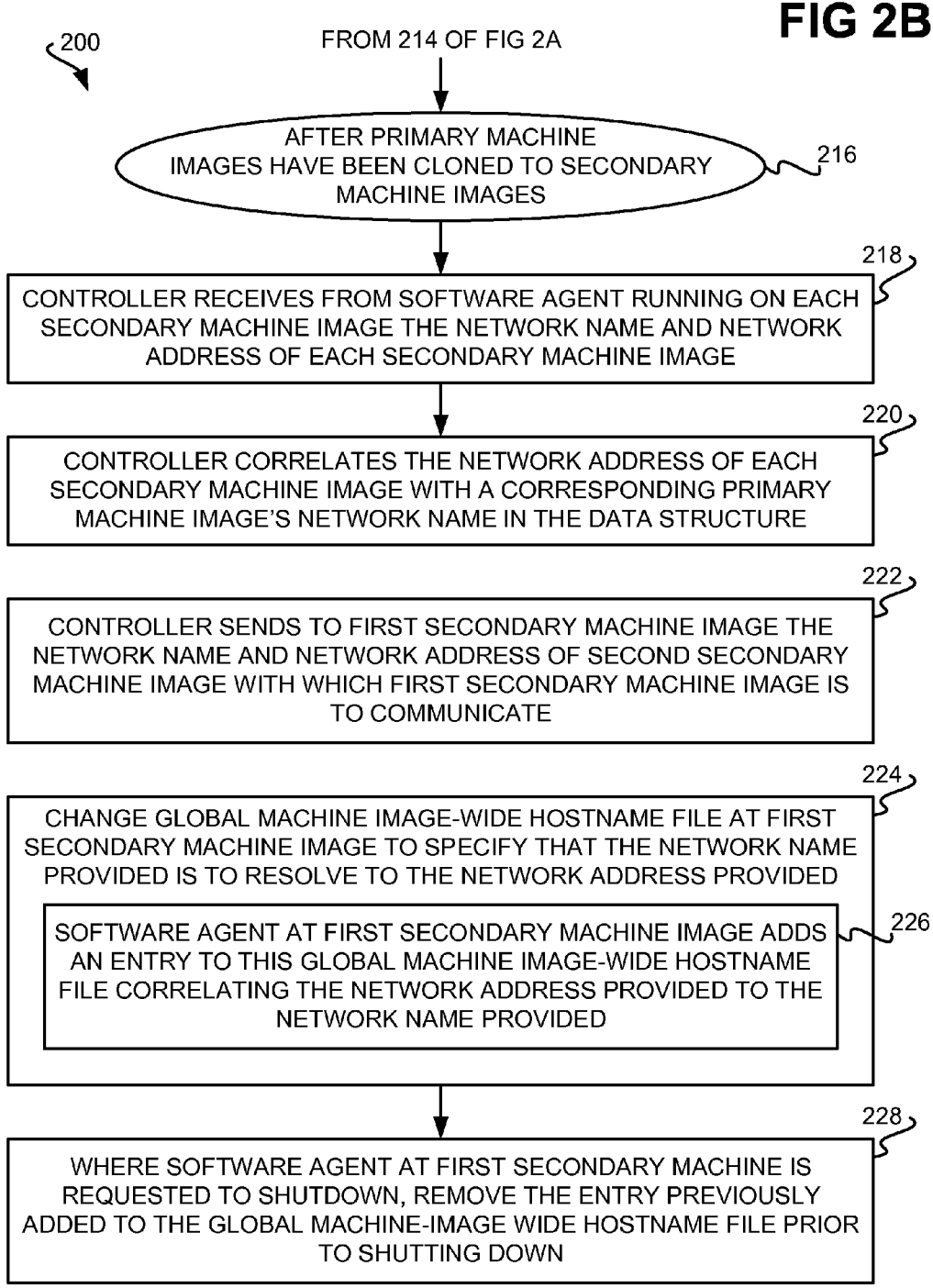

COMMUNICATION REDIRECTION WHERE PRIMARY MACHINE IMAGES ARE CLONED TO SECONDARY MACHINE IMAGES

BACKGROUND

Computing systems have become increasingly complex, necessitating their testing in testing environments. Once the computing systems have been successfully tested, the systems are then rolled out to production environments in which the computing systems are actually used for their intended purposes. Such computing systems can include both physical computing devices, as well as virtual computing devices, the latter which are also known as virtual machines.

SUMMARY OF THE INVENTION

A method of an embodiment of the invention includes determining, by a controller executed by a processor, that a first primary machine image communicates with a second primary machine image. This determination is performed prior to cloning the first primary machine image to a first secondary machine image and the second primary machine image to a second secondary machine image. The method includes cloning the first primary machine image to the first secondary machine image and the second primary machine image to the second secondary machine image.

As such, communication from the first secondary machine image to the second primary machine image is not directed to the second secondary machine image. After cloning the first primary machine image to the first secondary machine image and the second primary machine image to the second secondary machine image, the method includes changing, by a software agent running on the first secondary machine image, executed by a processor, and in communication with the controller, a global machine image-wide hostname file at the first secondary machine image. As such, the communication from the first secondary machine image to the second primary machine image is now directed to the second secondary machine image.

A computer program product of an embodiment of the invention includes a computer-readable storage medium having computer-readable code embodied therein. The computer-readable code is executable by a processor implementing a controller in an environment in which a first primary machine image is cloned to a first secondary machine image and a second primary machine image is cloned to a second secondary machine image. Communication from the first secondary machine image to the second primary machine image is not directed to the second secondary machine image. The computer-readable code includes first computer-readable code to maintain a data structure correlating a network address of the first primary machine image to a network name of the first primary machine image, and correlating a network address of the second primary machine image to a network name of the second primary machine image.

The computer-readable code includes second computer-readable code to indicate in the data structure that the first primary machine image communicates with the second primary machine image. The computer-readable code includes third computer-readable code to indicate in the data structure that a network address of the first secondary machine image correlates to a network name of the first primary machine image, and that a network address of the second secondary machine image correlates to a network name of the second primary machine image. The computer-readable code includes fourth computer-readable code to transmit to the first secondary machine image a network address of the second secondary machine image and a network name of the second secondary machine image.

A network name of the first secondary machine image is identical to the network name of the first primary machine image, and a network name of the second secondary machine image is identical to the network name of the second primary machine image. A software agent running on the first secondary machine image is to add an entry to a global machine image-wide hostname file at the first secondary machine image to specify that the network name of the second primary machine image is to resolve to the network address of the second secondary machine image. As such, the communication from the first secondary machine image to the second primary machine image is now directed to the second secondary machine image.

A computer program product of another embodiment of the invention includes a computer-readable storage medium having computer-readable code embodied therein. The computer-readable code is executable by a processor to implement a software agent running on a first secondary machine image to which a first primary machine image has been cloned. A second primary machine image has also been cloned to a second secondary machine image.

The computer-readable code includes first computer-readable code to transmit a network name of the first secondary machine image and a network address of the first secondary machine to a controller, and to receive a network name of the second secondary machine image and a network address of the second secondary machine image from the controller. The computer-readable code includes second computer-readable code to add an entry to a global machine image-wide hostname file at the first secondary machine image to specify that the network name of the second primary machine image is to resolve to the network address of the second secondary machine image. As such, communication from the first secondary machine image to the second primary machine image is directed to the second secondary machine image.

A system of an embodiment of the invention includes hardware, first and second primary machine images, first and second secondary machine images, a controller, and a software agent. The hardware includes at least a processor and memory. The first and second primary machine images are implemented by the hardware, and the first primary machine image communicates with the second primary machine image. The first and second secondary machine images are also implemented by the hardware. The first secondary machine image is cloned from the first primary machine image and the second secondary machine image is cloned from the second primary machine image.

As such, communication from the first secondary machine image to the second primary machine image is not directed to the second secondary machine image. The controller is implemented by the hardware and is to determine that the first primary machine image communicates with the second primary machine image. The software agent is at the first secondary machine image, is implemented by the hardware, and is in communication with the controller. The software agent is to change a global machine image-wide hostname file at the first secondary machine image so that the communication from the first secondary machine image to the second primary machine image is now directed to the second secondary machine image.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 2A and 2B are flowcharts of a method for ensuring that secondary machine images properly communicate with one another after they have been cloned from corresponding primary machine images, according to an embodiment of the invention.

DETAILED DESCRIPTION

Figure 1:
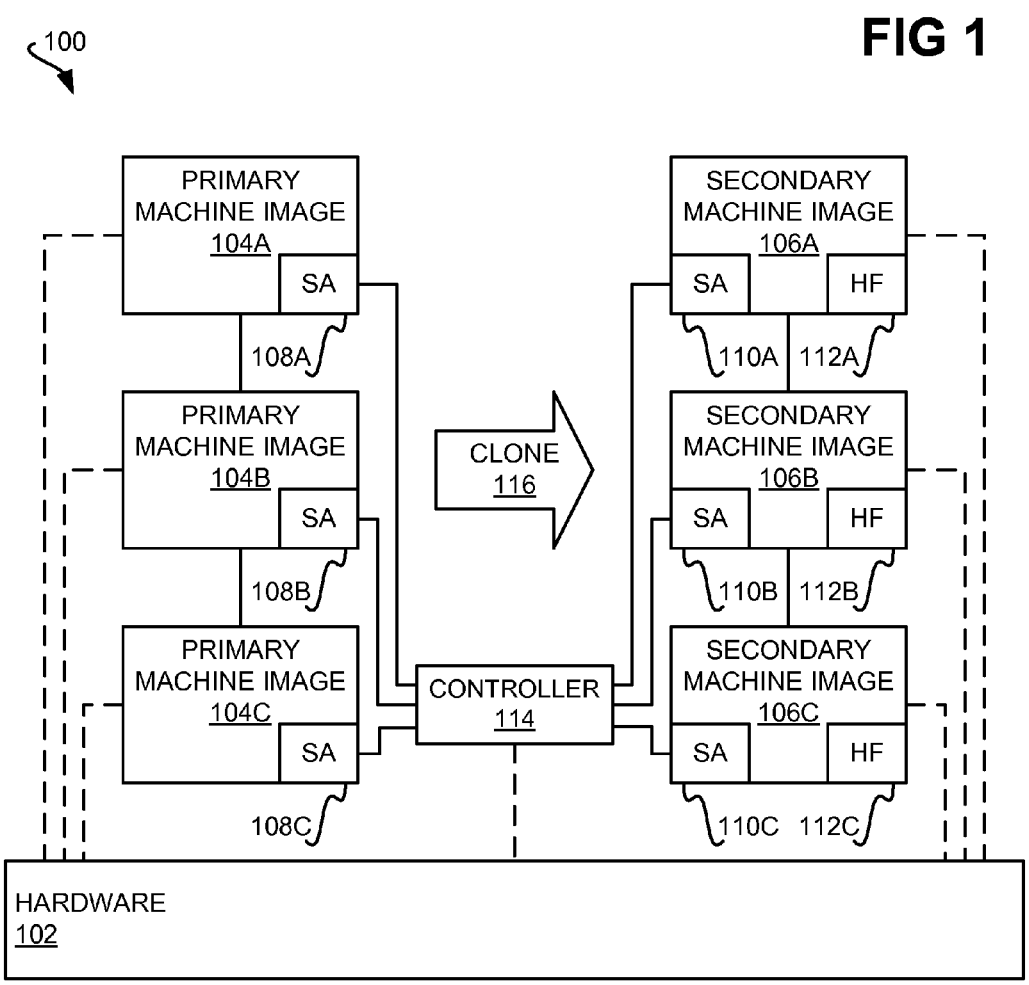
FIG. 1 is a diagram of a system in which primary machine images are cloned to secondary machine images, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, once a computing system has been successfully tested in a testing environment, the system is then rolled out to a production environment in which the computing system is actually used for its intended purpose. A computing system may include a number of machine images. A machine image is a snapshot of all the software running on a particular computing device, be it a physical computing device or a virtual computing device. As such, a machine image can be a virtual machine image or a physical machine image.

To roll out a computing system from a testing environment to a production environment, the machine images of the computing system can be cloned from the testing environment to the production environment. The machine images may be running on particular computing devices and other hardware within the testing environment. Therefore, the machine images are cloned to different particular computing devices and other hardware within the production environment, to roll out the computing system to the production environment.

For example, consider a rudimentary computing system having a first primary machine image, a second primary machine image, and a third primary machine image in a testing environment. The first machine image communicates with the second machine image and with the third machine image. Similarly, the second machine image communicates with the first machine image, as does the third machine image. These three machine images are cloned to a production environment. The resulting clones are referred to as the first secondary machine image, the second secondary machine image, and the third secondary machine image.

However, because the secondary machine images are clones of the primary machine images, the secondary machine images will not attempt to communicate with one another as in the testing environment. Rather, the first secondary machine image will attempt to communicate with the second primary machine image and with the third primary machine image, because the first secondary machine image is a clone of the first primary machine image. Likewise, the second secondary machine image will attempt to communicate with the first primary machine image, as will the third secondary machine image.

Therefore, after cloning the primary machine images to the secondary machine images, further modification has to be performed in relation to the secondary machine images before they operate correctly. This modification can be tedious and time-consuming. For example, a user such as a developer or a software engineer may have to examine each application program running on each secondary machine image, and modify the configuration file of each application program so that references to the primary machine images are changed to instead refer to the secondary machine images.

This process is tedious and time-consuming, because there may be a large number of application programs running on each secondary machine, and the application programs may reference the primary machine images in different ways in their configuration files. Furthermore, this process has the potential for introducing errors into the secondary machine images within the production environment where no such errors were present in the primary machine images within the testing environment. For example, a user may miss a reference to a primary machine image in an application program's configuration file such that the reference is not changed to refer to a corresponding secondary machine image, or the user may change the reference to refer to the wrong secondary machine image.

Techniques are disclosed herein that overcome these problems with cloning primary machine images of a testing environment to secondary machine images of a production environment. For instance, prior to cloning a first primary machine image to a first secondary machine image and a second primary machine image to a second secondary machine image, it may be determined that the first primary machine image communicates with the second primary machine image. Consistent with the description above, cloning the first and second primary machine images to the first and second secondary machine images results in communication from the first secondary machine image being improperly directed to the second primary machine image, instead of to the second secondary machine image.

Therefore, after cloning has occurred, a software agent running on the first secondary machine image changes a global machine image-wide hostname file at the first secondary machine image so that communication from the first secondary machine image directed to the second primary machine image is instead directed to the second secondary machine image. A user thus does not have to change configuration files of individual application programs running on the first secondary machine image as in the prior art, absolving the user from a tedious and time-consuming modification process that has the potential for introducing errors into the production environment. Indeed, the user is not involved in the process of directing communication at all in at least some embodiments of the invention.

The techniques disclosed herein further address the communication direction problem at a higher level than in the prior art. As noted above, in the prior art, each application program running on a secondary machine image has its configuration file inspected to locate references to primary machine images that have to be changed to instead refer to secondary machine images. By comparison, with the techniques disclosed herein, the configuration files of application programs are not inspected. Rather, a global machine image-wide hostname file is changed. An application program running on a secondary machine image will still try to communicate with a primary machine image, but will instead be directed to the corresponding secondary machine image, due to the changes that have been made to the hostname file.

FIG. 1 shows a representative computing system 100, according to an embodiment of the invention. The computing system 100 includes hardware 102. The hardware 102 can include processors, memory, storage devices like hard disk drives, as well as other types of hardware. The hardware 102 may be implemented over one or more different discrete computing devices.

The computing system 100 includes three representative primary machine images 104A, 104B, and 104C, which are collectively referred to as the primary machine images 104. The computing system 100 also includes three representative secondary machine images 106A, 106B, and 106C, which are collectively referred to as the secondary machine images 106. While three primary machine images 104 and three secondary machine images 106 are depicted in FIG. 1, the number of primary machine images 104 and the number of secondary machine images 106 can vary from that shown in FIG. 1. However, the number of the secondary machine images 106 is usually identical to the number of the primary machine images 104, because secondary machine images 106 are clones of the primary machine images 104.

Each machine image 104 and 106 can be a physical machine image or a virtual machine image. Furthermore, the primary machine images 104 may be located within a testing environment, whereas the secondary machine images 106 may be located within a production environment. As such, the hardware 102 that implements the primary machine images 104 may be different than the hardware 102 that implements the secondary machine images 106. The secondary machine images 106A, 106B, and 106C are clones of the primary machine images 104A, 104B, and 104C, respectively, as noted above.

The primary machine images 104 have software agents 108A, 108B, and 108C running thereon, which are collectively referred to as the software agents 108. The primary machine images 104 also have application programs running thereon, which are not depicted in FIG. 1. Each primary machine image 104 may have a global image-wide hostname file, which is also not depicted in FIG. 1.

Likewise, the secondary machine images 106 have software agents 110A, 110B, and 110C running thereon, which are collectively referred to as the software agents 110. The software agents 110 correspond to the software agents 108, insofar as the secondary machine images 106 are clones of the primary machine images 104. The secondary machine images 106 also have application programs running thereon, which are not depicted in FIG. 1.

The secondary machine images 106A, 106B, and 106C have global image-wide hostname files 112A, 112B, and 112C, respectively. A global image-wide hostname file is used to resolve a network name into a network address, such as an Internet Protocol (IP) address. In some types of operating systems, this global image-wide hostname file is referred to as a local-area network (LAN) manager hosts, or LMHOSTS, file. For a secondary machine image 106 to access a resource over a network, such as another secondary machine image 106 or another resource, the secondary machine image 106 has to resolve the network name of the resource into a corresponding network address, such that the resource is in actuality accessed by its network address.

This network name-to-network address resolution process is typically a two-part process. First, the global image-wide hostname file 112 of the secondary machine image 106 is checked to determine whether the network name is listed in the hostname file 112. If the network name is listed in the hostname file 112, then the network name is resolved to the network address listed for this network name in the hostname file 112, ending the resolution process. Second, if the network name is not listed in the hostname file 112 of the secondary machine image 106 in question, then a server external to the secondary machine image, which may be known as a domain name service (DNS) server, is referenced to resolve the network name to a corresponding network address.

For example, consider a situation where the secondary machine image 106A is attempting to resolve the network name of the primary machine image 104B to a network address. The network name of the secondary machine image 106B is identical to the network name of the primary machine image 104B, because the latter machine image 104B has been cloned to the former machine image 106B. A DNS server may list the network address of the primary machine image 104B as corresponding to this network name. By comparison, the global image-wide hostname file 112A of the secondary machine image 106A may list the network address of the secondary machine image 106B as corresponding to this network name. Therefore, the secondary machine image 106A resolves the network name in question to the network address for the secondary machine image 106B, instead of to the network address for the primary machine image 104B.

The computing system 100 operates as follows. Prior to cloning of the primary machine images 104 to the secondary machine images 106, the software agents 108 running on the primary machine images 104 report to a controller 114 the network names and the network addresses of the primary machine images 104. The controller 114 is a central software program that is also implemented by the hardware 102. The controller 114 may be part of one of the machine images 104, or the controller 114 may be part of a different machine image not depicted in FIG. 1.

Furthermore, each time an application program running on a primary machine image 104 issues a network access request, the software agent 108 running on this primary machine image 104 reports the network access request to the controller 114. Over time, the controller 114 therefore determines how the primary machine images 104 are communicating with one another. For instance, as depicted in FIG. 1, the controller 114 learns that the primary machine image 104B communicates with both the primary machine images 104A and 104C. The controller 114 also learns that each of the primary machine images 104A and 104C communicate with the primary machine image 104B.

After cloning of the primary machine images 104 to the secondary machine images 106 occurs, as indicated by the arrow 116, the software agents 108 running on the secondary machine images 106 report to the controller 114 the network names and the network addresses of the secondary machine images 106. As such, the controller 114 is able to correlate the secondary machine image 106A to the primary machine image 104A, since they share the same network name. Likewise, the controller 114 is able to correlate the secondary machine images 106B and 106C to the primary machine images 104B and 104C, respectively.

The controller 114 reports back to the software agent 110 running on each secondary machine image 106 the network name and network address of each other secondary machine image 106 with which the secondary machine image 106 is to communicate. The controller 114 knows the information, because the secondary machine images 106 are to communicate with one another in correspondence with how the primary machine images 104 have been detected as communicating with one another. For example, because the primary machine image 104A communicates with the primary machine image 104B and not with the primary machine image 104C, the controller 114 knows that the secondary machine image 106A is to communicate with the secondary machine image 106B and not with the secondary machine image 106C.

The controller 114 thus reports to the secondary machine image 106A the network name and network address of the secondary machine image 106B. The controller 114 reports to the secondary machine image 106B the network name and network address of each of the secondary machine images 106A and 106C. The controller 114 reports to the secondary machine image 106C the network name and network address of the secondary machine image 106B.

The software agent 110 at each secondary machine 106 adds corresponding entries to the global image-wide hostname file 112. For instance, the software agent 110A adds to the global image-wide hostname file 112A an entry indicating that network name of the secondary machine image 106B corresponds to the network address of this machine image 106B. The software agent 110B adds to the image-wide hostname file 112B entries indicating that the network names of the secondary machine images 106A and 106C correspond to the network addresses of the machine images 106A and 106C, respectively. The software agent 110C adds to the hostname file 112C an entry indicating that the network name of the secondary machine image 106B corresponds to the network address of this machine image 106B.

Therefore, the secondary machine images 106 are able to properly communicate with one another, as depicted in FIG. 1, instead of improperly attempting to communicate with the primary machine images 104. As a representative example, consider in particular an application program running on the secondary machine image 106A issuing a network access request that references the network name that is shared by both the primary machine image 104B and the secondary machine image 106B. Prior to the software agent 110A adding an entry to the global image-wide hostname file 112A that correlates the network name of the secondary machine image 106B to the network address of this machine image 106B, a DNS server may resolve the network name within the network access request to the network address of the primary machine image 104B. As such, the secondary machine image 106A attempts to communicate with the primary machine image 104B, instead of with the secondary machine image 106B, which is improper.

By comparison, after the software agent 110A has added an entry to the global image-wide hostname file 112A that correlates the network name within the network access request to the network address of the machine image 106B, the network name of the network access request is resolved to the network address of the secondary machine image 106B. While a DNS server may still associate this network name with the network address of the primary machine image 104B, this does not matter, because the image-wide hostname file 112A is first checked for the network name within the network address prior to the DNS server being requested to resolve the network name into a network address. Therefore, the secondary machine image 106A properly communicates with the secondary machine image 106B.

FIGS. 2A and 2B show a method 200 for ensuring that secondary machine images properly communicate with one another after they have been cloned from corresponding primary machine images, according to an embodiment of the invention. The method 200 is specifically described in relation to first and second primary machine images and first and second secondary machine images. More particularly, the method 200 is described in relation to a first primary machine image communicating with a second primary machine image, such that a first secondary machine image is to communicate with a second secondary machine image. However, the method 200 can be extended to more than two primary machine images and more than two secondary machine images. For instance, there may be more than two primary machine images, such that there are more than two secondary machine images.

Furthermore, the method 200 can be extended to more than a first primary machine image communicating with a second primary machine image, and thus to more than a first secondary machine image communicating with a second secondary machine image. For instance, the method 200 can also be extended to the second primary machine image communicating with the first primary machine image, and thus to the second secondary machine image communicating with the first secondary machine image. That is, the method 200 is described in relation to the changes that occur at the first secondary machine image, so that the first secondary machine image communicates with the second secondary machine image, instead of attempting to communicate with the second primary machine image. Similar changes can be made at the second secondary machine image, however, so that the second secondary machine image properly communicates with the first secondary machine image.

The following is performed prior to cloning the primary machine images to the secondary machine images (202). The controller receives from the software agent running on each primary machine image the network name and the network address of each primary machine image (204). The software agent at the first primary machine image thus transmits the network name and the network address of the first primary machine image to the controller, and the software agent at the second primary machine image thus transmits the network name and the network address of the second primary machine image to the controller.

The controller maintains a data structure correlating the network address of each primary machine image to the network name of each primary machine image (206). The data structure may be a table, for instance. The data structure thus indicates that the network name of the first primary machine image corresponds to the network address of the first primary machine image, and that the network name of the second primary machine image corresponds to the network address of the second primary machine image.

The controller than determines that, in the example of FIG. 2, the first primary machine image communicates with the second primary machine image (208). This can be achieved as follows. Each time an application program running on the first primary machine image issues a network access request, the software agent at the first primary machine image intercepts the request and transmits a copy of the request to the controller (210). The controller consults the data structure to determine whether the network name specified in the network access request relates to the second primary machine image; where it does, the controller indicates in the data structure that the first primary machine image communicates with the second primary machine image (212). As noted above, this process can be extended to determine with which other primary machine images the first primary machine image communicates, with which primary machine images the second primary machine image communicates, and so on.

The primary machine images are then cloned to the secondary machine images (214). Cloning may be performed by the controller as initiated by the user, or by another computer program. It is noted that cloning results in the first secondary machine image having the same network name as the first primary machine image, since the former image is a clone of the latter image. Likewise, the second secondary machine image has the same network name as the second primary machine image, since the former image is a clone of the latter image.

Note that if the remaining parts of the method 200 were not performed, such cloning would result in communication from the first secondary machine image being directed to the second primary machine image, instead of being properly directed to the second secondary machine image. The following is thus performed after the primary machine images have been cloned to the secondary machine images (216). As such, in the example of FIG. 2, the first secondary machine image properly communicates with the second secondary machine image and not with the second primary machine image The controller receives from the software agent running on each secondary machine image the network name and the network address of each secondary machine image (218). The software agent at the first secondary machine image thus transmits the network name and the network address of the first secondary machine image to the controller, and the software agent at the second secondary machine image transmits the network name and the network address of the second secondary machine image to the controller. The network addresses of the secondary machine images differ from the network addresses of their corresponding primary machine images, due to the manner by which network addresses are typically assigned, such as via the dynamic host configuration protocol (DHCP).

The controller correlates the network address of each secondary machine image with a corresponding primary machine image's network name in the data structure (220). The first secondary machine image shares a network name with the first primary machine image. As such, the controller correlates the network address of the first secondary machine image with this common network name in the data structure. The second secondary machine image shares a different network name with the second primary machine image. As such, the controller correlates the network address of the second secondary machine image with this common network name in the data structure.

In the example of FIG. 2, the controller then transmits to the first secondary machine image the network name and the network address of the second secondary machine image with which the first secondary machine is to communicate (222). The controller knows that the first secondary machine image is to communicate with the second secondary machine image, because the controller knows that the corresponding first primary machine image communicated with the corresponding second primary machine image, per part 208. Therefore, the controller transmits the network name and the network address of the second secondary machine image to the software agent at the first secondary machine image so that application programs at the first secondary machine image will communicate with the second secondary machine image instead of with the second primary machine image.

The global machine image-wide hostname file at the first secondary machine image is thus changed in the example of FIG. 2 to specify that the network name provided by the controller is to resolve to the corresponding network address provided by the controller (224). As such, communication from the first secondary machine image to this network name is directed to the second secondary machine image instead of to the second primary machine image. In one embodiment, part 224 can be achieved by the software agent at the first secondary machine image adding an entry to the global machine image-wide hostname file that correlates the network address provided by the controller to the network name provided by the controller (226). The network address provided is the network address of the second secondary machine image, and the network name provided is the network name shared by both the second primary and secondary machine images.

It is noted that the software agent at the first secondary machine image may be requested to shutdown, such as by the user. In this situation, the software agent removes the entry that it previously added to the global machine image-wide hostname file at the first secondary machine image before the software agent shuts down (228). This ensures that the changes made to the global machine image-wide hostname file are undone where the software agent is requested to no longer be run.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, radio frequency RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A method comprising:
   prior to cloning a first primary machine image to a first secondary machine image and a second primary machine image to a second secondary machine image, determining, by a controller executed by a processor, that the first primary machine image communicates with the second primary machine image;
   cloning the first primary machine image to the first secondary machine image and the second primary machine image to the second secondary machine image, such that communication from the first secondary machine image to a network name shared by the second primary machine image and the second secondary machine image is directed to the second primary machine image and is not directed to the second secondary machine image;
   after cloning the first primary machine image to the first secondary machine image and the second primary machine image to the second secondary machine image, changing, by a software agent running on the first secondary machine image, executed by a processor, and in communication with the controller, a global machine image-wide hostname file at the first secondary machine image so that the communication from the first secondary machine image to the network name shared by the second primary machine image and the second secondary machine image is now directed to the second secondary machine image and is not directed to the second primary machine image,
   wherein the global machine image-wide hostname file at the first secondary machine image maps network names only of network nodes other than the first secondary machine image to network addresses to which the network names resolve, and does not map a network name of the first secondary machine image to a network address of the first secondary machine image itself.

2. The method of claim 1, further comprising, prior to cloning the first primary machine image to the first secondary machine image and the second primary machine image to the second secondary machine image:
   receiving, by the controller from a software agent running on the first primary machine image, a network address of the first primary machine image and a network name of the first primary machine image;
   receiving, by the controller from a software agent running on the second primary machine image, a network address of the second primary machine image and a network name of the second primary machine image; and, maintaining, by the controller, a data structure correlating the network address of the first primary machine image to the network name of the first primary machine image, and correlating the network address of the second primary machine image to the network name of the second primary machine image.

3. The method of claim 1, wherein determining that the first primary machine image communicates with the second primary machine image comprises:
   each time an application program running on the first primary machine image issues a network access request, receiving, by the controller from the software agent running on the first primary machine image, a copy of the network access request; and,
   where the network access request relates to the network address of the second primary machine image, indicating by the controller in the data structure that the first primary machine image communicates with the second primary machine image.

4. The method of claim 3, further comprising, after cloning the first primary machine image to the first secondary machine image and the second primary machine image to the second secondary machine image:
   receiving, by the controller from the software agent running on the first secondary machine image, a network address of the first secondary machine image and a network name of the first secondary machine image, the network name of the first secondary machine image being identical to the network name of the first primary machine image;
   receiving, by the controller from a software agent running on the second secondary machine image, a network name of the second secondary machine image and a network name of the second secondary machine image, the network name of the second secondary machine image being identical to the network name of the second primary machine image; and,
   indicating, by the controller, in the data structure that the network address of the first secondary machine image correlates to the network name of the first primary machine image, and that the network address of the second secondary machine image correlates to the network name of the second primary machine image.

5. The method of claim 4, further comprising, after cloning the first primary machine image to the first secondary machine image and the second primary machine image to the second secondary machine image:
   receiving, by the software agent running on the first secondary machine image from the controller, the network address of the second secondary machine image and the network name of the second primary machine image.

6. The method of claim 5, wherein changing the global machine image-wide hostname file at the first secondary machine image comprises adding an entry to the global machine image-wide hostname file, by the software agent running on the first secondary machine image, to specify that the network name of the second primary machine image is to resolve to the network address of the second secondary machine image.

7. A computer program product comprising:
   a storage device having computer-readable code embodied therein, the computer-readable code executable by a processor implementing a controller in an environment in which a first primary machine image is cloned to a first secondary machine image and a second primary machine image is cloned to a second secondary machine image such that communication from the first secondary machine image to the second primary machine image is not directed to the second secondary machine image, the computer-readable code comprising:
      first computer-readable code to maintain a data structure correlating a network address of the first primary machine image to a network name of the first primary machine image, and correlating a network address of the second primary machine image to a network name of the second primary machine image;
      second computer-readable code to indicate in the data structure that the first primary machine image communicates with the second primary machine image;
      third computer-readable code to indicate in the data structure that a network address of the first secondary machine image correlates to a network name of the first primary machine image, and that a network address of the second secondary machine image correlates to a network name of the second primary machine image; and,
      fourth computer-readable code to transmit to the first secondary machine image a network address of the second secondary machine image and a network name of the second secondary machine image,
   wherein a network name of the first secondary machine image is identical to the network name of the first primary machine image, and a network name of the second secondary machine image is identical to the network name of the second primary machine image,
   and wherein a software agent running on the first secondary machine image is to add an entry to a global machine image-wide hostname file at the first secondary machine image to specify that the network name of the second primary machine image is to resolve to the network address of the second secondary machine image so that the communication from the first secondary machine image to the second primary machine image is now directed to the second secondary machine image,
   wherein the global machine image-wide hostname file at the first secondary machine image maps network names only of network nodes other than the first secondary machine image to network addresses to which the network names resolve, and does not map a network name of the first secondary machine image to a network address of the first secondary machine image itself.

8. The computer program product of claim 7, wherein the first computer-readable code is further to receive from a software agent running on the first primary machine image the network address of the first primary machine image and the network name of the first primary machine image, and is further to receive from a software agent running on the second primary machine image the network address of the second primary machine image and the network name of the second primary machine image.

9. The computer program product of claim 7, wherein the second computer-readable code is further to receive from the software agent running on the first primary machine image a copy of a network access request each time an application program running on the first primary machine image issues the network access request, and is further to indicate that the first primary machine image communicates with the second primary machine image where the network access request relates to the network address of the second primary machine image.

10. The computer program product of claim 7, wherein the third computer-readable code is further to receive from a software agent running on the first secondary machine image the network address of the first secondary machine image and the network name of the first secondary machine image, and is further to receive from a software agent running on the second secondary machine image the network address of the second secondary machine image and the network name of the second secondary machine image.

11. A computer program product comprising:
a storage device having computer-readable code embodied therein, the computer-readable code executable by a processor to implement a software agent running on a first secondary machine image to which a first primary machine image has been cloned, where a second primary machine image has also been cloned to a second secondary machine image, the computer-readable code comprising:
first computer-readable code to transmit a network name of the first secondary machine image and a network address of the first secondary machine to a controller, and to receive a network name of the second secondary machine image and a network address of the second secondary machine image from the controller; and,
second computer-readable code to add an entry to a global machine image-wide hostname file at the first secondary machine image to specify that the network name of the second primary machine image is to resolve to the network address of the second secondary machine image so that communication from the first secondary machine image to the second primary machine image is directed to the second secondary machine image,
wherein the global machine image-wide hostname file at the first secondary machine image maps network names only of network nodes other than the first secondary machine image to network addresses to which the network names resolve, and does not map a network name of the first secondary machine image to a network address of the first secondary machine image itself.

12. The computer program product of claim 11, wherein the computer-readable code further comprises third computer-readable code to, responsive to the software agent being requested to shutdown, remove the entry added to the global machine image-wide hostname file prior to the software agent shutting down.

13. The computer program product of claim 11, wherein the first secondary machine image is one of a virtual machine image and a physical machine image.

14. A system comprising:
hardware including at least a processor and memory;
a first primary machine image and a second primary machine image implemented by the hardware, the first primary machine image communicating with the second primary machine image;
a first secondary machine image and a second secondary machine image implemented by the hardware, the first secondary machine image cloned from the first primary machine image and the second secondary machine image cloned from the second primary machine image such that communication from the first secondary machine image to a network name shared by the second primary machine image and the second secondary machine image is directed to the second primary machine image and is not directed to the second secondary machine image;
a controller implemented by the hardware to determine that the first primary machine image communicates with the second primary machine image;
a software agent at the first secondary machine image, implemented by the hardware, and in communication with the controller to change a global machine image-wide hostname file at the first secondary machine image so that the communication from the first secondary machine image to the network name shared by the second primary machine image and the second secondary machine image is now directed to the second secondary machine image and is not directed to the second primary machine image,
wherein the global machine image-wide hostname file at the first secondary machine image maps network names only of network nodes other than the first secondary machine image to network addresses to which the network names resolve, and does not map a network name of the first secondary machine image to a network address of the first secondary machine image itself.

15. The system of claim 14, further comprising a software agent at the first primary machine image, and a software agent at the second primary machine image,
wherein prior to the first primary machine image being cloned to the first secondary machine image and the second primary machine image being cloned to the second secondary machine image,
the controller is to receive from the software agent at the first primary machine image a network address of the first primary machine image and a network name of the first primary machine image,
the controller is to receive from the software agent at the second primary machine image a network address of the second primary machine image and a network name of the second primary machine image,
and the controller is to maintain a data structure correlating the network address of the first primary machine image to the network name of the first primary machine image, and correlating the network address of the second primary machine image to the network name of the second primary machine image.

16. The system of claim 15, wherein each time an application program at the first primary machine image issues a network access request, the controller is to receive from the software agent at the first primary machine image a copy of the network access request,
and where the network access request relates to the network address of the second primary machine image, the controller is to indicate in the data structure that the first primary machine image communicates with the second primary machine image.

17. The system of claim 16, further comprising a software agent at the second secondary machine,
wherein after the first primary machine image has been cloned to the first secondary machine image and the second primary machine image has been cloned to the second secondary machine image,
the controller is to receive from the software agent at the first secondary machine image a network address of the first secondary machine image and a network name of the first secondary machine image, the network name of the first secondary machine image being identical to the network name of the first primary machine image,
the controller is to receive from the software agent at the second secondary machine image, a network name of the second secondary machine image and a network name of the second secondary machine image, the network name of the second secondary machine image being identical to the network name of the second primary machine image, and the controller is to indicate in the data structure that the network address of the first secondary machine image correlates to the network name of the first primary machine image, and that the network address of the second secondary machine image correlates to the network name of the second primary machine image.

18. The system of claim 17, wherein after the first primary machine image has been cloned to the first secondary machine image and the second primary machine image has been cloned to the second secondary machine image, the software agent at the first secondary machine image is to receive from the controller the network address of the second secondary machine image and the network name of the second primary machine image, and the software agent at the first secondary machine is to add an entry to the global machine image-wide hostname file to specify that the network name of the second primary machine image is to resolve to the network address of the second secondary machine image.

19. The system of claim 14, wherein at least one of the first primary machine image, the second primary machine image, the first secondary machine image, and the second secondary primary machine are each a virtual machine image.

20. The system of claim 14, wherein at least one of the first primary machine image, the second primary machine image, the first secondary machine image, and the second secondary primary machine are each a physical machine image.

* * * * *